{ United States Patent Office — 2,844,512 — Patented July 22, 1958 }

2,844,512

FUMAGILLIN ENVELOPED IN FATTY OR WAXY SUBSTANCE AND ENCLOSED IN ULTRAVIOLET OPAQUE CONTAINER

Thomas E. Eble, Kalamazoo, Mich., assignor to The Upjohn Company, Kalamazoo, Mich., a corporation of Michigan No Drawing. Application November 5, 1954
Serial No. 467,228

3 Claims. (Cl. 167—83)

This invention relates to compositions of matter and to a method for the preparation thereof and is particularly directed to compositions of crystalline fumagillin in which the particles of fumagallin are completely enclosed in an air-impervious, edible mass of material, preferably of a fatty or waxy nature, and to a process in which a coating is deposited on the surface of the particles of fumagillin by evaporation of solvent from a mixture of fumagillin with a solution of said material.

This application is a continuation-in-part of application Serial No. 364,211, filed June 25, 1953, now abandoned.

Fumagillin is an antibiotic obtained by the action of fumagillin ferment, *Aspergillus fumigatus* H–3 (NRRL 2319), on a dextrin-corn steep medium, or like nutrient medium, and has been found to have utility in the treatment of various pathological conditions, particularly of infections with *Endamoeba histolytica* [Hanson and Eble, J. Bacteriology 58, 528 (1949); Eble and Hanson, Antibiotics and Chemotherapy 1, 54 (1951); McCowen et al., Science 113, 202 (1951)]. It is a white crystalline solid having the probable empirical formula, $C_{27}H_{36}O_7$, a melting point of 190–191 degrees centigrade, an optical rotation, $[\alpha]_D^{25}$, of minus 26.6 degrees, a molecular weight of about 475–490, and a specific extinction coefficient ($k$) of 145–148 at 351 mu. It forms a methyl ester melting at 145–147 degrees centigrade, an octabromide melting at 118–122 degrees centigrade, and a 2,4-dinitrophenylhydrazone melting at 123–126 degrees centigrade.

It has now been found that pure crystalline fumagillin tends to lose activity on aging and that this tendency to lose activity can be prevented by completely enclosing the particles of pure crystalline fumagillin in an air-impervious mass of edible material so as to exclude oxygen from contact therewith. Thus pure crystalline fumagillin assaying 100 percent fumagillin ($k$ value at 351 mu=148) has been observed to lose more than ten percent of its activity within ten days and thereafter to lose activity at the rate of about ten percentage points per month, whereas pure crystalline fumagillin, treated in accordance with the invention and stored under the same conditions, that is, in brown bottles at room temperature, was observed to have substantially undiminished activity after prolonged storage.

In preparing certain compositions according to the invention, freshly prepared crystalline fumagillin is mixed with a solution of the coating material containing sufficient coating material so that on evaporation of the solvent, a continuous, massive, impervious coating is deposited on the surfaces of the crystals and thereafter evaporating the solvent, advantageously with stirring, to give the desired composition. The solvent for the coating material may or may not also be solvent for the fumagillin, though advantageously it is nonsolvent or substantially nonsolvent for fumagillin. By "substantially nonsolvent" it is meant that in the proportions used, the bulk of the fumagillin is not dissolved. If some or all of the fumagillin is dissolved, that is, molecularly dispersed in the solution of coating material, separation of the coating material and the fumagillin will take place simultaneously during the evaporation of the solvent. Ordinarily if the solvent is nonsolvent or substantially nonsolvent for the fumagillin, a more homogeneous product is obtained.

As coating materials suitable for use in this invention, there may be used any edible substance which on evaporation of solvent from a solution thereof is deposited as a continuous, impervious, massive coating. Such substances generally are fatty or waxy substances, such as natural fats and waxes, fatty acids, fatty alcohols, and the like which are solid at normal temperature and yet soft enough to be easily molded. Lecithin has been found particularly suitable for use in the processes and compositions of the invention. Other materials which similarly can be used include spermaceti, stearic acid, cholesterol, stearin, stearyl amides, polyalkylene oxide condensation products, cephalin and other like phosphatides related to lecithin or contained in technical lecithin, hydrogenated fats, such as hydrogenated cotton seed oil, and the like.

The solvent used as above noted is advantageously either nonsolvent or substantially nonsolvent for fumagillin. Otherwise the character of the solvent is determined by the character of the substance used for the coating. Where water-soluble substances are used, water can be used as the solvent, otherwise any of the organic solvents ordinarily used to dissolve the coating substances of the character involved, especially the fatty and waxy substances, can be used. Clorinated hydrocarbons such as chloroform, carbon tetrachloride, and the polychlorethylenes can be used advantageously.

An important feature of the invention lies in the massive character of the coating deposited on the fumagillin crystals. This is obtained by using relative to the amount of fumagillin an amount of coating substance substantially in excess of that ordinarily used for coating purposes. Suitably from about two to about fifteen parts of plastic substance for every ten parts of fumagillin is used. Within this range, substantial protection of the fumagillin against deterioration is obtained. Lower proportions can be used, but the amount of protection accorded to the fumagillin is correspondingly lower. Higher proportions also can be used but the advantage obtained, if any, does not outweigh the disadvantages of increased cost and increased bulk. Advantageously from about five to about ten parts of coating for every ten parts of fumagillin is used.

Instead of coating the particles of fumagillin with a massive coating of edible plastic material, the fumagillin particles can be dispersed in a continuous mass of such material or in a liquid material confined in a suitable container. Thus the particles of fumagillin can be dispersed in a continuous vehicle, advantageously a fatty or waxy vehicle (solid or liquid), and enclosed in a suitable container, such as a soft elastic capsule. The container serves additionally to exclude air and also, if suitably pigmented or colored or otherwise rendered opaque to ultraviolet light, as was the brown bottle used in the above storage tests, serves to exclude ultraviolet radiations which have now been found to promote decomposition of fumagillin, even in the absence of oxygen.

When fumagillin is dispersed in a continuous mass, the relative proportion of mass to fumagillin advantageously is greater than when the individual particles are coated with isolated masses of material, in order to provide material to fill the interstices between the particles and still provide a massive envelope about the same. The proportions suitably can range from about one-half part of enveloping material to each part of fumagillin to any greater proportion within the limits of practicality. Ordinarily, however, it will not be necessary or desirable for the proportions to exceed about 25 parts of enveloping material for each part of fumagillin.

The invention can now be more fully understood by the following examples which are illustrative of the processes and compositions of the present invention, but are not to be construed as limiting. Unless otherwise specified, parts and percentages are by weight.

EXAMPLE 1

Fumagillin is recrystallized from aqueous methanol until pure white crystals having a specific extinction coefficient $k$ of 148.0 are obtained. As pure fumagillin has a $k$ value of about 146.5±1.5, the $k$ value of 148.0 indicates 100 percent purity.

A 600-milligram sample of the pure crystalline fumagillin thus prepared is mixed thoroughly with a solution of 600 milligrams of lecithin (Glidden lecithin HG2299X) in fifteen mils of chloroform. The chloroform is then blown off under nitrogen and the material vacuum dried. The material thus obtained had a $k$ value of 147.0.

In the following table, there is shown the results obtained on aging of the coated and uncoated fumagillin. The aging is carried out in brown bottles at room temperature for the time indicated.

Table I
COMPARATIVE RESISTANCE TO AGING OF COATED AND UNCOATED FUMAGILLIN

| Time at Room Temp. | $k$ Value at 351 mu | | Percent Fumagillin | |
|---|---|---|---|---|
| | Uncoated | Coated | Uncoated | Coated |
| 0 days | 148.0 | 147.0 | 100.+ | 100.+ |
| 2 days | 140.2 | 147.0 | 96.0 | 100.+ |
| 3 days | 142.6 | 145.0 | 97.4 | 99.1 |
| 6 days | 130.4 | 145.7 | 89.2 | 99.4 |
| 10 days | 130.2 | 145.2 | 89.1 | 99.4 |
| 13 days | 129.0 | 146.3 | 88.2 | 99.9 |
| 20 days | 127.9 | 146.0 | 87.4 | 99.7 |
| 24 days | 125.9 | 144.5 | 86.0 | 98.7 |
| 27 days | 126.3 | 147.3 | 86.4 | 100.0 |
| 35 days | 121.8 | 146.2 | 83.3 | 99.8 |
| 55 days | 109.0 | 143.8 | 74.2 | 98.0 |
| 66 days | 104.2 | 143.0 | 71.2 | 97.8 |
| 87 days | 70.0 | 144.0 | 48.0 | 98.4 |

These data show substantially undiminished activity of the coated fumagillin over a period of 87 days with hardly any significant change after the third day as compared with a sharp drop of at least ten percentage points within ten days and progressive deterioration thereafter for the uncoated fumagillin.

EXAMPLE 2

Following the procedure of Example 1 but using carbon tetrachloride, a nonsolvent for fumagillin, in place of the chloroform in which the fumagillin is partially soluble, compositions containing smaller amounts of lecithin are prepared. The results compared with uncoated fumagillin are given in the following table:

Table II
COMPARATIVE STABILITY OF LECITHIN COATED FUMAGILLIN AND UNCOATED IN PERCENT OF PURITY AGAINST THE AGING TIME

| Aging Time | Uncoated | 4.76% (1:20) Lecithin | 16.6% (1:5) Lecithin | 33.3% (1:2) Lecithin | Example I (1:1) |
|---|---|---|---|---|---|
| 0 days | 100 | 100 | 100 | 100 | 100.+ |
| 1 day | 100 | 100 | 100 | 100 | |
| 4 days | 93 | 96 | 98 | 100 | |
| 8 days | 89 | 96 | 98 | 100 | |
| 21 days | 85 | 87 | 93 | 97 | 99.7 |

These data show that some improvement in stability is obtained with small proportions of lecithin to fumagillin but that relatively high proportions, that is, at least two parts and preferably from five to ten parts of lecithin for each ten parts of fumagillin is needed to stabilize the fumagillin over any substantial period.

EXAMPLE 3

Following the procedure of Example 2, fumagillin is coated with spermaceti and with stearic acid in the ratio of one part of coating for each part of fumagillin. Aging tests on these two materials are given in the following table:

Table III
COMPARATIVE AGING OF COATED FUMAGILLIN AND UNCOATED FUMAGILLIN

| Time | Uncoated, percent | Spermaceti Coating, percent | Stearic Acid Coating, percent |
|---|---|---|---|
| 0 days | 98 | 99 | 101 |
| 5 days | 94 | 98 | 100 |
| 12 days | 87 | | 99 |
| 19 days | 86 | 98 | 99 |

These data taken with the data given in Tables I and II show that effective stabilization of fumagillin is obtained by incasing the crystals by a waxy or fatty plastic substance in amount sufficient to give a continuous, massive, impervious, edible coating.

Crystalline fumagillin ordinarily will range in crystal size from about three to about 1500 microns depending upon how it is recrystallized. In compounding, the larger crystals can be reduced by milling to a particle size more suitable for the compounding operations. Generally speaking, if the crystals have a particle size greater than about 300 microns or so, they are advantageously milled to a particle size less than about 300 microns and then enclosed in an air-impervious mass of material in accordance with the invention. Also if the recrystallization is properly controlled, crystals having an average particle size of less than 300 microns can be obtained without milling. In such cases the coated fumagillin crystals, prepared according to the invention, can be processed directly into tablets and filled capsules as desired. Milling of coated fumagillin is undesirable because milling tends to disrupt the continuity of the coating. When compressed tablets are made, however, milling is not so objectionable because the desired continuity of the coating tends to be re-established by the granulating and compressing steps.

The following example is illustrative of suitable compositions.

EXAMPLE 4

Lecithin-coated fumagillin (Example 1) _____ milligrams__ 25
Ascorbic acid _____do____ 15
Lactose _____grains__ 3½

The amounts given above are those required for one tablet and are increased according to the number of tablets desired. The lecithin coated fumagillin is milled to a particle size ranging from 100 to 300 microns and mixed with ascorbic acid and lactose in the proportions indicated. The resulting powder is granulated with a sucrose-water solution. The syrup is added to produce a doughy mass (about 0.11 grain of sucrose per tablet) which is passed through a screen to granulate it. On drying, granules of about sixteen to eighteen mesh are obtained. These granules are lubricated with 0.1 grain of starch and 0.05 grain calcium stearate per tablet and then compressed in a tableting machine. The ascorbic acid functions as an antioxidant to protect particles of fumagillin exposed in the milling and tableting operations. Other food grade antioxidants, such as are more particularly enumerated below, can be substituted for ascorbic acid.

In place of lactose there may be substituted starch or other inert fillers. Instead of granulating and tableting, the mixture can be filled into hard capsules. Also the coated fumagillin with or without ascorbic acid can be suspended in an edible liquid such as corn oil and like edible liquid nonsolvent for the coating and processed into soft capsules.

The fumagillin without lecithin coating can also be suspended in a liquid fat thereby enveloping the particles in a continuous, impervious mass, as distinguished from a continuous, impervious coating, and the suspension encapsulated in a soft gelatin capsule. The suspensions obtained without lecithin are more stable, the lecithin coating apparently acting to thin the oil. The following example is illustrative:

EXAMPLE 5

| | Milligrams |
|---|---|
| Fumagillin powder (assay 970 mg./gm.) | 12 |
| Ascorbic acid | 10 |
| Peanut oil | 160 |
| Cotoflake (hydrogenated vegetable oil) | 5.27 |

The amounts given above are those required for one capsule and are increased according to the number of capsules desired. The total fill weight of each capsule is 196 milligrams. The fumagillin and ascorbic acid are dispersed in the peanut oil containing Cotoflake as a thickener and the resulting suspension encapsulated in opaque soft gelatin by the usual procedure for forming soft elastic capsules. The resulting capsules were subjected to accelerated aging tests in comparison with untreated fumagillin compounded as follows in hard-filled capsules:

| Fumagillin (assay 970 mg./gm.) | milligrams | 12 |
|---|---|---|
| Ascorbic acid | do | 10 |
| Lactose | grains | 3.5 |

The results obtained are shown in the following table:

*Table IV*

COMPARATIVE AGING OF FUMAGILLIN IN PEANUT OIL IN SOFT ELASTIC CAPSULES AND FUMAGILLIN IN HARD-FILLED CAPSULES

| Temperature | Loss of Activity | |
|---|---|---|
| | Soft Elastic Capsules | Hard-Filled Capsules |
| 40° C | 0% in 30 days | 22% in 15 days |
| 50° C | 0% in 30 days | 33% in 10 days / 45% in 20 days |
| 60° C | 0% in 30 days | 42% in 10 days / 58% in 20 days |
| 70° C | 0% in 30 days | 61% in 10 days / 81% in 20 days |

In place of peanut oil there can be substituted other liquid and non-liquid or semi-liquid fats such as cottonseed oil, corn oil, sesame oil, paraffin oil, hydrogenated fats, and the like or blends of the same. In place of ascorbic acid there can be substituted other edible antioxidants, such as, α-tocopherol, cephaline, NDGA (nordehydroguaretic acid), tertiary-butylhydroxyanisole, citric acid, propyl gallate, ditertiary-butyl-paracresol, and the like and mixtures thereof. The ascorbic acid can also be eliminated, in which case it is desirable to use otherwise deoxygenated oils, for example, by heating with or without an antioxidant. It will be understood that some forms of these oils will contain natural antioxidants.

It is to be understood that the invention is not limited to the exact details of operation or exact compounds shown and described, as obvious modifications and equivalents will be apparent to one skilled in the art, and the invention is therefore to be limited only by the scope of the appended claims.

I claim:

1. An ultraviolet opaque soft elastic capsule containing crystalline fumagillin completely enveloped in an air-impervious, edible mass selected from the class consisting of fatty and waxy materials in the proportions of from 0.5 to 25 parts of said edible mass for each part of fumagillin.

2. Divided fumagillin, the particles of which are completely and air-imperviously enveloped in and in intimate contact with an adible substance selected from the class consisting of fatty and waxy substances in the proportion of from 0.5 to 25 parts of said edible substance for each part of fumagillin and the aggregate of which is enclosed in an ultraviolet-opaque container.

3. The method of protecting fumagillin from inactivation which comprises completely enveloping the particles of finely divided fumagillin in an air-impervious, edible material selected from the class consisting of fatty and waxy substances in the proportion of from 0.5 to 25 parts of said edible material for each part of fumagillin and enclosing the aggregate of the enveloped particles in a container opaque to ultraviolet radiation.

References Cited in the file of this patent

UNITED STATES PATENTS

| 22,433 | Jenkins | Dec. 28, 1858 |
| 1,246,392 | Carrasco | Nov. 13, 1917 |
| 1,575,529 | Bollmann | Mar. 2, 1926 |
| 1,809,016 | Brogden | June 9, 1931 |
| 1,827,219 | Brogden | Oct. 13, 1931 |
| 1,831,728 | Working | Nov. 10, 1931 |
| 2,449,039 | Libby | Sept. 7, 1948 |
| 2,464,053 | Omohundro | Mar. 8, 1949 |
| 2,470,281 | Allingham | May 17, 1949 |
| 2,487,336 | Hinds | Nov. 8, 1949 |
| 2,652,356 | Hanson | Sept. 15, 1953 |

FOREIGN PATENTS

| 669,709 | Great Britain | Apr. 9, 1952 |

OTHER REFERENCES

Barron: Handbook of Antibiotics, Reinhold Pub. Co., N. Y. C., 1950, entry "Lupulon," p. 157.

Stanistreet: Australasian J. Pharmacy, September 30, 1946, pp. 730–733, esp. at p. 730.

Asheshov: Identity of Fumagillin and Phagopedin Sigma, Antibiotics and Chemotherapy, July 1952, pp. 361 and 362.